US008098432B2

(12) United States Patent
Ishizawa et al.

(10) Patent No.: US 8,098,432 B2
(45) Date of Patent: Jan. 17, 2012

(54) OPTICAL MULTI-LAYER THIN FILM, OPTICAL ELEMENT, AND METHOD FOR PRODUCING THE OPTICAL MULTI-LAYER THIN FILM

(75) Inventors: Hitoshi Ishizawa, Kawasaki (JP); Shunsuke Niisaka, Fujisawa (JP)

(73) Assignee: Nikon Corporation, Tokyo (JP)

( * ) Notice: Subject to any disclaimer, the term of this patent is extended or adjusted under 35 U.S.C. 154(b) by 132 days.

(21) Appl. No.: 12/342,200

(22) Filed: Dec. 23, 2008

(65) Prior Publication Data
US 2009/0161219 A1 Jun. 25, 2009

Related U.S. Application Data

(63) Continuation of application No. PCT/JP2007/062518, filed on Jun. 21, 2007.

(30) Foreign Application Priority Data

Jun. 27, 2006 (JP) ................................. 2006-176967

(51) Int. Cl.
*G02B 1/10* (2006.01)
(52) U.S. Cl. ....................................... 359/581; 359/586
(58) Field of Classification Search .................. 359/581, 359/586, 587, 589
See application file for complete search history.

(56) References Cited

U.S. PATENT DOCUMENTS 5,243,255 A * 9/1993 Iwasaki ........................ 313/478
2008/0261053 A1 10/2008 Arndt et al.

FOREIGN PATENT DOCUMENTS

| JP | 63-139302 A | 6/1988 |
| JP | 04-155731 A | 5/1992 |
| JP | 04-334853 A | 11/1992 |
| JP | 07-272646 A | 10/1995 |
| JP | 08-122501 A | 5/1996 |
| JP | 09-222504 A | 8/1997 |
| JP | 2000-171609 A | 6/2000 |
| WO | WO 02/18982 A1 | 3/2002 |
| WO | WO 2005/120154 A2 | 12/2005 |

OTHER PUBLICATIONS

Translation of International Preliminary Report on Patentability from PCT/JP2007/062518.

* cited by examiner

*Primary Examiner* — Alessandro Amari
(74) *Attorney, Agent, or Firm* — Miles & Stockbridge P.C.

(57) ABSTRACT

Optical multi-layer thin film comprises: an outermost layer stacked above an optical surface of an optical substrate having a lower refractive index than the optical substrate; and at least a certain refractive index layer disposed between the optical substrate and the outermost layer, and having a refractive index adjustable in a predetermined range higher than that of the outermost layer. The outermost layer is formed by a wet film-formation method using: low-refractive-index fine particles made of a low-refractive-index material; and a first binder, and the certain refractive index layer is formed by a wet film-formation method using: high-refractive-index fine particles made of a high-refractive-index material; and a second binder which has a refractive index different from that of the high-refractive-index material.

8 Claims, 4 Drawing Sheets

OPTICAL MULTI-LAYER THIN FILM, OPTICAL ELEMENT, AND METHOD FOR PRODUCING THE OPTICAL MULTI-LAYER THIN FILM

CROSS-REFERENCE TO RELATED APPLICATION

This application is a continuation of International Application No. PCT/JP2007/062518 filed Jun. 21, 2007.

BACKGROUND OF THE INVENTION

1. Field of the Invention

The present invention relates to: an optical multi-layer thin film including a layer made of a high-refractive-index material and an outermost layer made of a low-refractive-index material; an optical element in which the optical multi-layer thin film is stacked, and which is used for an optical instrument such as a camera, a microscope, binoculars, and a projector; and a producing method for forming the optical multi-layer thin film.

2. Related Background Art

The surface of each lens, such as a camera lens and an objective lens, constituting an optical system is coated with an anti-reflection film to reduce reflection from the lens. Generally, an optical thin film is formed by a dry method (dry process). As the dry process, a vacuum deposition method, a sputtering method, a CVD (Chemical Vapor Deposition) method, or the like, is used. It is known that, in order to obtain a high-performance anti-reflection film having a low reflectance over a wide wavelength band or a wide angular band, a multi-layer film should be formed by combining multiple coating materials having different refractive indexes from each other.

When a multi-layer anti-reflection film is designed and formed by the vacuum deposition method, deposition substances of various refractive indexes are selected for use. Generally, $TiO_2$ having a refractive index of 2.4 to 2.7 is utilized as the highest-refractive-index substance, while $MgF_2$ having a refractive index of 1.38 is utilized as the lowest-refractive-index substance. Typical deposition substances with refractive indexes between the highest and the lowest are $Al_2O_3$ of 1.65, $ZrO_2$ of 2.0, and $Ta_2O_5$ of 2.16. A deposition substance having a refractive index of 1.65 to 2.0 as well as practical applicability is yet to be found.

For example, Japanese Unexamined Patent Application Publication No. 2000-171609 (Document 1) proposes that an intermediate refractive index film of from 1.65 to 2.0 be obtained by use of a mixture. It is stated, here, that an intermediate refractive index film in a range of 1.6 to 1.9 is obtained by use of a deposition substance made of samarium oxide and aluminum oxide.

However, it has been considerably difficult to obtain a refractive index of between 1.65 and 2.0 by use of a mixture. This is because, in order to obtain a certain refractive index by continuously changing refractive indexes, modification has to be made to the composition itself of the deposition substance. Furthermore, even when the mixture is used, some range of refractive index is still difficult to obtain.

Moreover, for example, Japanese Unexamined Patent Application Publication No. Hei 8-122501 (Document 2) and the like propose that an anti-reflection film be formed by a wet film-formation method. In this wet film-formation method, the film is formed by applying a liquid onto a substrate by a spin coating method, a dipping method, a spray method, a roll coating method, or the like, and by drying and heating the liquid-applied substrate. As an advantage of the wet film-formation method, a large-sized apparatus is unnecessary unlike the dry process. Moreover, the film can be formed under the atmosphere, so that the cost can be reduced significantly.

However, in the wet film-formation method, it is difficult to adjust the refractive index and the film thickness accurately in comparison with a vacuum deposition method and the like. When an excellent anti-reflection property is to be obtained, a larger number of layers have to be stacked. Meanwhile, the application and drying steps need to be performed for each layer. For these reasons, the formation of multi-layer film requires a lot of works. When a multi-layer film is formed by the wet film-formation method, the number of layers that can be stacked is approximately three layers at most in practice.

When the excellent property is obtained with the small total layer number such as two or three layers, at least the uppermost layer must be a low refractive index film having a refractive index of 1.30 or lower. It has been found from a simulation result that, by making the uppermost layer be the low refractive index film having a refractive index of 1.30 or lower, an optical performance can be improved significantly. Specifically, the significantly improved effects can be obtained: a wider wavelength band in which the reflectance can be suppressed to be low; and a larger incident angle at which the reflectance of incident light over a wide angular range in addition to normal incident light can be suppressed to be low.

It is known that such a low refractive index film can be obtained by forming a porous film. Generally, the wet method is known to be suitable for obtaining such a porous film.

For example, International Publication No. WO02/18982 (Document 3) discloses a method for forming a porous $MgF_2$ film. In this disclosed method, a $MgF_2$ sol solution is prepared and heat-treated at a high temperature and high pressure using an autoclave. Accordingly, the $MgF_2$ fine particles are grown, crystallized, and deposited to form a film. Even at this point, pores between the fine particles do not collapse, and thus a high porosity can be maintained. As a result, the film becomes porous, and the refractive index can be reduced significantly in comparison with a compacted film.

SUMMARY OF THE INVENTION

However, even when the outermost layer is a low refractive index film having a refractive index of 1.30 or lower as in Document 3, a single or multiple layers having a different refractive index from that of the outermost layer need to be formed therebelow in order to obtain the more excellent anti-reflection property. In that case, the refractive indexes required for the individual layers are automatically determined according to an optical glass to be used. For example, suppose a case where an outermost layer has a refractive index of 1.25 in a two-layered configuration. In this case, when an anti-reflection film is designed for a general optical glass (refractive index: approximately 1.5 to 2.0), it is determined that the refractive index of an inner layer be in a range from 1.45 to 1.70. Moreover, the allowable error for the refractive index of such an inner layer is small. For these reasons, it is demanded that the inner layer be formed to have a desired refractive index accurately, the desired refractive index being set on the basis of the refractive indexes of the optical glass and the outermost layer. However, in the dry film-formation method, it is not easy to form a film having an accurately adjusted refractive index in an arbitrary manner. Meanwhile, in the wet film-formation method, such accurate adjustment is not achievable.

Thus, an object of the present invention is to provide an optical multi-layer thin film including layers whose refractive indexes are adjustable easily and accurately to be in desired ranges, the thin film capable of providing a desired anti-reflection property easily with a smaller number of stacked layers. Moreover, another object is to provide an optical element with a more excellent anti-reflection property by including such an optical multi-layer thin film, and further provide a method capable of producing such an optical multi-layer thin film.

In order to solve the above-described problems, the optical multi-layer thin film of the present invention is an optical multi-layer thin film comprising:

an outermost layer which is stacked above an optical surface of an optical substrate, and which has a lower refractive index than that of the optical substrate; and at least one certain refractive index layer which is disposed between the optical surface of the optical substrate and the outermost layer, and which has a refractive index adjustable in a predetermined range higher than that of the outermost layer, wherein the outermost layer is formed by a wet film-formation method using:

low-refractive-index fine particles made of a low-refractive-index material having a lower refractive index than that of the optical substrate; and a first binder which binds the low-refractive-index fine particles together, and the certain refractive index layer is formed by a wet film-formation method using:

high-refractive-index fine particles made of a high-refractive-index material having a higher refractive index than that of the low-refractive-index material; and a second binder which has a refractive index different from that of the high-refractive-index material, and which binds the high-refractive-index fine particles together.

Moreover, In the optical multi-layer thin film of the present invention, the certain refractive index layer preferably has a refractive index between those of the high-refractive-index material and the second binder.

Furthermore, in the optical multi-layer thin film of the present invention, the high-refractive-index material is preferably any one of $TiO_2$ and $ZrO_2$.

Moreover, in the optical multi-layer thin film of the present invention, the low-refractive-index material is preferably $MgF_2$.

Furthermore, in the optical multi-layer thin film of the present invention, the first binder and the second binder are preferably made of an identical intermediate-refractive-index material having a refractive index between those of the low-refractive-index material and the high-refractive-index material.

Moreover, in the optical multi-layer thin film of the present invention, the intermediate-refractive-index material is preferably $SiO_2$.

Furthermore, in the optical multi-layer thin film of the present invention, preferably, the refractive index of the certain refractive index layer is from 1.45 to 1.9, and the refractive index of the outermost layer is from 1.20 to 1.40.

The optical element of the present invention is an optical element comprising:

an optical substrate having a refractive index of from 1.5 to 2.1; and the optical multi-layer thin film according to any one of claims 1 to 7, the thin film stacked on an optical surface of the optical substrate.

Moreover, in the optical element of the present invention, a reflectance of substantially an entire surface of the optical surface is preferably 2% or lower in a wavelength range from 400 nm to 1100 nm.

Furthermore, in the optical element of the present invention, the optical surface is preferably any one of a convex surface and a concave surface having a value of (effective diameter D)/(radius R) being 1.2 or larger.

The method for producing an optical multi-layer thin film of the present invention is a method comprising the steps of:

preparing a second sol solution in which high-refractive-index fine particles made of a high-refractive-index material and a second binder component having a refractive index different from that of the high-refractive-index material are dispersed in an alcohol dispersion medium;

preparing a first sol solution in which low-refractive-index fine particles made of a low-refractive-index material and a first binder component are dispersed in an alcohol dispersion medium;

forming a certain refractive index layer above an optical surface of an optical substrate using the second sol solution by a wet film-formation method, the certain refractive index layer being formed with at least a surface thereof hardened; and forming and hardening an outermost layer on an outer side of the certain refractive index layer using the first sol solution by a wet film-formation method, in the second sol solution, a component ratio of the high-refractive-index fine particles to the second binder component being adjusted so that the certain refractive index layer has a refractive index in a predetermined range higher than that of the outermost layer.

Moreover, in the method for producing an optical multi-layer thin film of the present invention, concentrations of the high-refractive-index fine particles and the second binder component in the second sol solution are preferably adjusted so that the certain refractive index layer has a film thickness in a predetermined range.

Furthermore, in the method for producing an optic al multi-layer thin film of the present invention, the wet film-formation method is preferably a method in which at least one sol solution selected from the group consisting of the first and the second sol solutions are applied by any one of a spin coating method and a dip coating method.

Moreover, in the method for producing an optical multi-layer thin film of the present invention, the second sol solution is preferably prepared by:

chelating an alkoxide to serve as a precursor of the high-refractive-index fine particles;

hydrolyzing the alkoxide in the alcohol dispersion medium to thereby form a high-refractive-index fine particle sol solution containing the high-refractive-index fine particles; and mixing the second binder component with the high-refractive-index fine particle sol solution.

According to the optical multi-layer thin film of the present invention, the certain refractive index layer is formed by the wet film-formation method using: the high-refractive-index fine particles; and the second binder, which have refractive indexes different from each other. Thereby, this configuration makes the refractive index adjustable. Thus, by adjusting the component ratio of these, it is possible to adjust the refractive index easily and accurately in an arbitrary manner. Moreover, the outermost layer is formed by the wet film-formation method using: the low-refractive-index fine particles having a lower refractive index than the optical substrate; and the first binder. Thereby, by adjusting the component ratio of these, the outermost layer is formed to have a refractive index as low as possible easily. As a result, a desired anti-reflection property is easily obtained with a smaller number of stacked layers.

According to the optical element of the present invention, the optical multi-layer thin film of the present invention is stacked on the optical surface of the optical substrate having a refractive index of from 1.5 to 2.1. Thereby, it is possible to provide an optical element capable of lowering the reflectance greatly with the optical multi-layer thin film having the desired anti-reflection property. Moreover, the optical multi-layer thin film can be formed by the wet film-formation method with a smaller number of stacked layers. Thus, the production is also easy.

According to the forming method of the present invention, by adjusting the component ratio of the high-refractive-index fine particles to the second binder component in the second sol solution for forming the certain refractive index layer, the refractive index of the certain refractive index layer is adjusted in a predetermined range. Thereby, the accurate formation of a certain refractive index layer having a desired refractive index is facilitated. Moreover, both this certain refractive index layer and the outermost layer are formed by the wet film-formation method. Thus, the formation of each layer is also made easy. As a result, it is possible to easily form an optical multi-layer thin film having a desired anti-reflection property.

DETAILED DESCRIPTION OF THE PREFERRED EMBODIMENTS

Hereinafter, embodiments of the present invention will be described.

Figure 1:
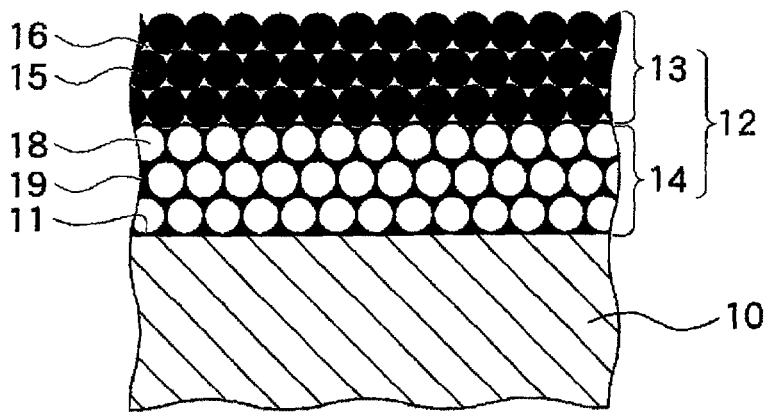
FIG. 1 is a schematic diagram showing a structure of an optical multi-layer thin film having a two-layered configuration according to an embodiment of the present invention.

FIG. 1 shows an optical element including an optical multi-layer thin film of this embodiment.

The optical element in FIG. 1 has a configuration in which an optical multi-layer thin film 12 for anti-reflection is stacked on an optical surface 11 of an optical substrate 10, the optical multi-layer thin film 12 comprising an outermost layer 13 and a certain refractive index layer 14.

The optical element is not particularly limited, as long as the optical element is any of various members irradiated with light. The examples are various lenses, filters, prisms, plate materials, and the like, which are used in various optical instruments, for example: precision optical instruments such as cameras, microscopes, binoculars, projectors, and eyeglasses; displays such as liquid crystal display devices, plasma displays, electroluminescence displays, and cathode ray tube display devices; window glasses; show windows; and the like.

Examples of the optical substrate 10 used in these optical elements include: a glass such as BSC7, BAC4, F2, DF5, DF13, LAF103, and LADF41; and plastic mainly made of urethane acrylate and methacrylate. Preferably, the optical substrate is a substrate used mainly in a wavelength range from 400 nm to 1100 nm. The optical substrate is a material having a refractive index of from 1.5 to 2.1, and preferably from 1.6 to 1.8, the refractive index being measured with light of 550 nm.

The shape of such an optical substrate 10 is not particularly limited; the optical substrate 10 should have one or multiple optical surfaces 11. Such an optical surface 11 may be flat shaped. In this embodiment, the optical surface 11 has a curved surface of a convex shape, a concave shape, or the like. Particularly, it is possible to adopt an optical surface having a value of (effective diameter D)/(radius R) being 1.2 or larger. In this way, D/R indicates the degree of curvature of a lens. The value of 2 indicates a perfect semi-sphere. The lower the value, the flatter the curved surface.

The optical multi-layer thin film 12 stacked on the optical surface 11 comprises: the outermost layer 13 having a lower refractive index than the optical substrate 10; and the certain refractive index layer 14 disposed between the outermost layer 13 and the optical surface 11 of the optical substrate 10, the certain refractive index layer 14 having a higher refractive index than the outermost layer 13. One layer or two layers of the certain refractive index layer 14 are preferably provided therefor. In this embodiment, one layer of the certain refractive index layer 14 is stacked thereon.

Here, the outermost layer 13 is made of a film formed by a wet film-formation method using: low-refractive-index fine particles 15 made of a low-refractive-index material having a lower refractive index than the optical substrate 10; and a first binder 16 for binding the low-refractive-index fine particles 15 together. The outermost layer 13 has a structure in which a porous layer made of a large number of the aggregated low-refractive-index fine particles 15 is reinforced by the first binder 16.

Such an outermost layer 13 preferably has a refractive index of from 1.20 to 1.40, measured with light of 550 nm. It is desirable that the refractive index be as low as possible, and particularly be 1.30 or lower. This is because the outermost layer 13 having a lower refractive index tends to improve the anti-reflection property.

The low-refractive-index fine particles 15 of such an outermost layer 13 are made of a low-refractive-index material such as a fluoride having a lower refractive index than the optical substrate 10. A preferable material as such a low-refractive-index material has a refractive index as low as possible, for example, 1.40 or lower, when a compacted film is formed of the low-refractive-index material by a dry film-formation method such as a vacuum deposition method. This is because the refractive index is easily secured within a wide adjustment range. Particularly desirable is $MgF_2$ that is the lowest-refractive-index material.

The low-refractive-index fine particles 15 formed of the low-refractive-index material as described above are preferably fine particles having an average particle diameter of from 1 nm to 100 nm, and particularly preferably fine particles with high crystallinity. This is because such fine particles would easily widen gaps formed between the fine particles, and make it easy to reduce the compactation due to adhesion or the like between the fine particles in the formation process.

The first binder 16 is made of an optical material capable of binding the low-refractive-index fine particles 15 together and binding the low-refractive-index fine particles 15 to the certain refractive index layer 14. This first binder 16 preferably has a refractive index different from that of the low-refractive-index material. This is because the component ratio of these makes the refractive index of the outermost layer 13 adjustable.

When the material having a refractive index as low as possible is selected as the low-refractive-index material, the refractive index of this first binder 16 generally becomes higher than the refractive index of the low-refractive-index material. Here, as the first binder 16, preferably used is an intermediate-refractive-index material having a refractive index between those of the low-refractive-index material and a high-refractive-index material of the certain refractive index layer 14 that will be described later. Particularly preferable is a material having a refractive index equivalent to that of the optical substrate 10. This is because it is easy to adjust the refractive index.

An example of such a first binder 16 includes an amorphous silicon oxide-based binder $SiO_2$. The raw material of this binder is in a liquid state, and changed into $SiO_2$ by heat. The $SiO_2$ is formed between the large number of low-refractive-index fine particles 15 in an amorphous state, and thereby is capable of binding the low-refractive-index fine particles 15 integratedly.

It is possible to use a certain ratio of such a first binder 16 relative to the low-refractive-index fine particles 15. In this way, the refractive index of the outermost layer 13 can be adjusted in accordance with the ratio. As the component ratio of the first binder 16 to the low-refractive-index fine particles 15 is made lower, the refractive index of the outermost layer 13 can be made lower.

Here, by lowering the component ratio of the first binder 16 to the low-refractive-index fine particles 15, the gaps formed between the large number of low-refractive-index fine particles 15 can exist as pores with air remained therein. Thereby, the refractive index of the outermost layer 13 can be made lower than the refractive index of the low-refractive-index material. In this case, the refractive index of the outermost layer 13 can be adjusted in accordance with the combination of: the low-refractive-index fine particles 15; the first binder 16; and the air.

If the component ratio of the first binder 16 to the low-refractive-index fine particles 15 is too low, the mechanical strength of the outermost layer 13 is likely to be reduced. Additionally, the outermost layer 13 is likely to be peeled off by hand-wiping, ultrasonic cleaning, or the like. For this reason, the component ratio of the first binder 16 to the low-refractive-index fine particles 15 is preferably reduced into a range so that a sufficient film strength can be obtained.

For example, the component ratio should be reduced so that the film strength measured by the micro indentation test can be 30 MPa or higher.

When the low-refractive-index fine particles 15 and the first binder 16 are respectively made of $MgF_2$ and $SiO_2$, the decrease in the $SiO_2$ concentration leads to the decrease in the refractive index down to 1.19 that is the refractive index of a film formed of porous $MgF_2$ fine particles in which no $SiO_2$ is used at all. On the other hand, the increase in the $SiO_2$ concentration leads to the increase in the refractive index up to 1.45 that is the refractive index of a $SiO_2$ film formed of only $SiO_2$. Thus, the refractive index can be set to be any value within a range of 1.19 to 1.45.

In such a case, when the amount of the first binder 16 made of $SiO_2$ is 30 wt % or less relative to the low-refractive-index fine particles 15 made of $MgF_2$, unordered multiple pores can be formed inside the outermost layer 13, lowering the refractive index. Meanwhile, when the amount is 10 wt % or more, or when the refractive index of the resulting outermost layer 13 is within a range of 1.23 or higher, a sufficient film strength is easily secured.

Note that the thickness of such an outermost layer 13 is desirably 90 nm to 110 nm. It is preferable to adjust its reflectance as low as possible within a desired wavelength range in accordance with the refractive index and the thickness of the outermost layer 13.

In the meanwhile, the certain refractive index layer 14 is made of a film formed by a wet film-formation method using: high-refractive-index fine particles 18 made of a high-refractive-index material having a higher refractive index than the low-refractive-index material; and a second binder 19 having a refractive index different from that of the high-refractive-index material, the second binder 19 binding the high-refractive-index fine particles 18 together. The certain refractive index layer 14 preferably has a structure in which the high-refractive-index fine particles 18 and the second binder 19 exist in a relatively compacted manner so that a smaller number of pores may exist inside the certain refractive index layer 14.

Such a certain refractive index layer 14 preferably has a refractive index of from 1.45 to 1.9, measured with light of 550 nm. Particularly, the refractive index of the certain refractive index layer 14 is automatically determined in accordance with the refractive index of the optical substrate 10 and the refractive index of the outermost layer 13 adopted in the optical multi-layer thin film 12. Accordingly, the refractive index of the certain refractive index layer 14 needs to be adjusted in a predetermined range of refractive index within this range.

The high-refractive-index fine particles 18 of such a certain refractive index layer 14 are made of a high-refractive-index material such as an oxide having a higher refractive index than the low-refractive-index material. A preferable material as this high-refractive-index material has a refractive index as high as possible, for example, 1.9 or higher, when a compacted film is formed of the high-refractive-index material by a dry film-formation method such as a vacuum deposition method. This is because the refractive index is easily secured within a wide adjustment range.

Examples of such high-refractive-index material include $La_2O_3$, $HfO_2$, $ZrO_2$, $Ta_2O_5$, $Nb_2O_5$, $TiO_2$, and the like. Particularly desirable is $TiO_2$ that is the highest-refractive-index material.

Moreover, the average particle diameter of the high-refractive-index fine particles 18 formed of the high-refractive-index material as described above is preferably 0.1 nm to 10 nm. This is because small gaps are easily formed between high-refractive-index fine particles 18, and because a relatively compacted layer is easily formed.

The second binder 19 is made of an optical material capable of binding the high-refractive-index fine particles 18 together and binding the high-refractive-index fine particles 18 to the optical substrate 10 or the outermost layer 13. Such a second binder 19 may be filled substantially completely into the multiple gaps formed between the high-refractive-index fine particles 18.

Such a second binder 19 needs to be a material having a refractive index different from that of the high-refractive-index material, the refractive index being measured when the material is formed into a compacted film by a dry film-formation method such as a vacuum deposition method. This is because the component ratio of these makes the refractive index of the certain refractive index layer 14 adjustable.

When a material having a refractive index as high as possible is used as the high-refractive-index material, the refractive index of the second binder 19 is generally lower than that of the high-refractive-index material. In this manner, the second binder 19 is desirably made of an intermediate-refractive-index material having a refractive index between those of the high-refractive-index material and the low-refractive-index material of the outermost layer 13. Particularly preferable is a material having a refractive index equivalent to that of the optical substrate 10.

As such a second binder 19, a binder that is similar to the above-described first binder 16 can be exemplified. Particularly desirably, a binder identical to the first binder 16 is used. This is because the formation can be accomplished more easily by reducing the number of the kinds of materials used. Moreover, this is because the adjustment range for the refractive index of the certain refractive index layer 14 is easily secured within a wide range in accordance with the refractive index of the outermost layer 13, and because the refractive index of the certain refractive index layer 14 is easily adjusted.

Particularly, when $SiO_2$ is used in the first binder 16 and the second binder 19, the refractive indexes of the layer 13 and the layer 14, which are set on the basis of the refractive index of the optical substrate 10, are easily adjusted. This is because $SiO_2$ have a refractive index equivalent to that of the optical substrate 10.

It is possible to use a certain ratio of such a second binder 19 relative to the high-refractive-index fine particles 18. In this way, the refractive index of the certain refractive index layer 14 can be adjusted in accordance with the ratio. In a range where the component ratio of the second binder 19 to the high-refractive-index fine particles 18 is low, the refractive index of the certain refractive index layer 14 can be increased.

For example, when the high-refractive-index fine particles 18 and the second binder 19 are respectively made of $TiO_2$ and $SiO_2$, the decrease in the $SiO_2$ concentration leads to the increase in the refractive index up to 1.90 that is the refractive index of a film made of relatively compacted porous $TiO_2$ fine particles in which no $SiO_2$ is used at all. On the other hand, the increase in the $SiO_2$ concentration leads to the decrease in the refractive index down to 1.45 that is the refractive index of a $SiO_2$ film formed of only $SiO_2$. Thus, the refractive index can be set to be any value within a range of 1.45 to 1.90 by the component ratio.

Note that the thickness of such a certain refractive index layer 14 is desirably 60 nm to 100 nm. It is preferable to adjust its reflectance as low as possible at a desired wavelength range in accordance with the thickness and the refractive index of the certain refractive index layer 14.

In the optical multi-layer thin film 12 having the configuration as described above, the outermost layer 13 is formed by the wet film-formation method using the first binder 16 and the low-refractive-index fine particles 15 having a lower refractive index than the optical substrate 10. By adjusting the ratio of these components, it is possible to form the outermost layer 13 having a refractive index as low as possible while the film strength is being secured. Simultaneously, the certain refractive index layer 14 is formed by the wet film-formation method using the high-refractive-index fine particles 18 and the second binder 19 which have refractive indexes different from each other. The refractive index of the certain refractive index layer 14 is adjustable within a higher range than that for the outermost layer 13. Thus, by adjusting the ratio of these components, it is possible to accurately adjust the refractive index in an arbitrary manner. It is also possible to easily form the certain refractive index layer 14 having a refractive index even in a range that is not obtainable easily by a dry film-formation method such as a vacuum deposition method. Consequently, the optical multi-layer thin film 12 having a desired anti-reflection property is easily obtained with a smaller number of stacked layers.

Moreover, when such a certain refractive index layer 14 of the optical multi-layer thin film 12 has a refractive index between those of the high-refractive-index fine particles 18 and the second binder 19, a smaller number of pores can exist inside as described above in the structure in which the high-refractive-index fine particles 18 and the second binder 19 can thus be disposed relatively compactly therein. Therefore, the refractive index can be adjusted easily and accurately by the component ratio of the high-refractive-index fine particles 18 to the second binder 19. Furthermore, with such a structure, it is easy to form the interlayer boundary clearly even by the wet film-formation method, and the anti-reflection property is easily improved.

Moreover, according to the optical element 10 comprising such an optical multi-layer thin film 12 stacked on the optical surface 11 of the optical substrate 10, the reflectance of substantially the entire surface of the optical surface 11 can be 2% or lower in a wavelength range from 400 nm to 1100 nm.

Furthermore, even when the optical surface 11 is a curved surface of a convex shape or a concave shape, the optical multi-layer thin film 12 can be formed by the wet film-formation method. Thereby, it is possible to form the optical multi-layer thin film 12 uniformly and easily on the entire curved surface of a large curvature, and the desired anti-reflection property is obtained accurately on the entire surface of the optical surface 11.

Note that, in the above description, the optical multi-layer thin film 12 including one layer of the certain refractive index layer 14 has been described. However, it is possible to form two layers of the certain refractive index layers 14, and the same effects as described above can be obtained.

Next, a method for producing an optical multi-layer thin film 12 as described above will be described.

In this embodiment, a second sol solution is prepared for forming a certain refractive index layer 14, and a first sol solution is prepared for forming an outermost layer 13. These first sol solution and second sol solution are sequentially applied on an optical surface 11 of an optical substrate 10 for film formation, and hardened. Thus, the optical multi-layer thin film 12 can be formed.

Firstly, in this embodiment, the second sol solution is prepared preferably as follows. An alkoxide to serve as a precursor of high-refractive-index fine particles 18 is chelated. Then, the alkoxide thus chelated is hydrolyzed under a presence of water and a catalyst in an alcohol dispersion medium.

Thus, a high-refractive-index fine particle sol solution containing the high-refractive-index fine particles 18 is formed.

The alkoxide used in this embodiment is a substance to serve as a precursor of the high-refractive-index fine particles 18. The example includes alkoxides of La, Hf, Zr, Ta, Nb, Ti, and the like. For example, when $TiO_2$ is to be obtained as the high-refractive-index material, titanium isopropoxide or the like can be used.

For chelating the alkoxide, for example, acetic acid or acetylacetone can be added to the alkoxide and stirred for the reaction.

As a condition for such a chelation treatment, an equimolar amount of acetic acid or acetylacetone with that of the alkoxide should be added thereto.

When the alkoxide is hydrolyzed after the chelation treatment as described above, an average particle diameter of the high-refractive-index fine particles 18 can be made smaller and uniform. Consequently, the light scattering by the certain refractive index layer 14 can be suppressed to the minimum.

The high-refractive-index fine particle sol solution can be formed by hydrolyzing the chelated alkoxide as follows. For example, the chelated alkoxide is added dropwise gradually into an alcohol dispersion medium added with water and a catalyst, and stirred for one hour or longer.

At this point, as the alcohol dispersion medium, a lower alcohol such as methanol and ethanol can be used. Methanol is particularly desirable. Moreover, as the catalyst, a mineral acid such as nitric acid can be used.

Subsequently, the obtained high-refractive-index fine particle sol solution is mixed with a second binder component to thereby prepare the second sol solution in which high-refractive-index fine particles together with the second binder component are dispersed in the alcohol dispersion medium. This second binder component is a substance that can form the second binder 19 by heat treatment, reaction, or the like. As necessary, for example, alkoxysilane, polysilazane, or the like, capable of forming a $SiO_2$ amorphous structure by heat treatment or the like, can be used with the catalyst.

In this embodiment, the component ratio of the high-refractive-index fine particles 18 to the second binder component as well as the concentrations of the high-refractive-index fine particles 18 and the second binder component is adjusted in the preparation of this second sol solution.

The component ratio is adjusted to thereby adjust the refractive index of the certain refractive index layer 14. This is because the component ratio of the high-refractive-index fine particles to the second binder component in the second sol solution is the same as the component ratio of the resulting certain refractive index layer 14. Here, the adjustment is made so that the refractive index of the certain refractive index layer 14 can be at least higher than that of the outermost layer 13, and be within a predetermined range that is automatically determined in accordance with the refractive indexes of the outermost layer 13 and the optical substrate 10 as described above.

For adjusting the component ratio in this way, for example, a small amount of the second sol solution is added to a second binder solution. The added amount is determined so that the film can have a predetermined refractive index.

Meanwhile, the concentrations of the high-refractive-index fine particles 18 and the second binder component are adjusted because the film thickness of the certain refractive index layer 14 to be obtained can be adjusted. This film thickness is adjusted to be 60 nm to 100 nm.

For adjusting the concentrations as described above, for example, the mixed solution is temporarily condensed using a rotary evaporator, and then diluted with a higher alcohol or the like to thereby adjust the concentrations.

Next, the first sol solution in this embodiment can be prepared as follows. For example, multiple components from which a low-refractive-index material is obtained by a reaction are reacted with each other in an alcohol dispersion medium, and fine particles are synthesized and precipitated. Specifically, when $MgF_2$ is used as the low-refractive-index material, a magnesium compound and a fluorine compound are mixed and reacted with each other in the alcohol medium. Thus, a low-refractive-index fine particle sol solution in which low-refractive-index fine particles are dispersed in the alcohol dispersion medium can be formed.

Here, as the magnesium compound, acetate salts, chlorides, alkoxides, or the like can be used. Magnesium acetate is desirable.

Moreover, as the fluorine compound, a hydrogen fluoride aqueous solution (hydrofluoric acid), anhydrous hydrogen fluoride, trifluoroacetic acid, or the like can be used. Hydrofluoric acid is desirable.

Furthermore, as the alcohol dispersion medium, various alcohols can be used. Methanol is desirable.

During such a reaction, the molar ratio of fluorine in the fluorine compound to magnesium in the magnesium compound (F/Mg ratio) is preferably from 1.9 to 2.0, since the refractive index of the resulting outermost layer 13 can be suppressed to be low.

The $MgF_2$ fine particles obtained in this manner preferably has a high crystallinity. The obtained reaction product is desirably subjected to at least one treatment selected from the group consisting of pressure-treatment and heat-treatment.

Thereafter, the obtained low-refractive-index fine particle sol solution is mixed with a first binder component or an alcohol dispersion solution thereof to prepare the first sol solution in which the low-refractive-index fine particles together with the first binder component are dispersed in the alcohol dispersion medium. This first binder component is, as similar to the aforementioned second binder component, a substance that can form a first binder 16 by heat treatment, reaction, or the like.

After that, the second sol solution obtained as described above is applied on the optical surface 11 of the optical substrate 10 by a wet film-formation method for the film formation. Examples of such a wet film-formation method include a spin coating method, a dip coating method, a spray method, a roll coating method, and the like. In this embodiment, any one of the spin coating method and the dip coating method is adopted.

In a case of a dry film-formation method such as a vacuum deposition method and a sputtering method, when the film is formed on a curved lens, forming the film having the uniform film thickness is difficult so that a peripheral portion of the lens is thin generally. For this reason, when the optical multi-layer thin film is formed by the dry film-formation method, the reflectance at the peripheral portion of the lens differs from that at the central portion thereof in some cases.

In contrast, in the spin coating method or the dip coating method of this embodiment, a liquid is applied on the optical surface 11 of the optical substrate 10 for the film formation. Accordingly, when the optical surface 11 is a curved surface, the liquid flows along the curved surface. By taking an advantage of this liquid flowing nature, the film can be formed relatively easily, uniformly and entirely even on the surface of the curved surface having a large curvature, that is, D/R of 1.2 or larger. Therefore, it is possible to form the certain refractive index layer 14 considerably easily in comparison with the vacuum deposition method, the sputtering method, and the like.

At this point, when the alcohol dispersion medium is methanol, the evaporation speed is too fast, and thereby it is not easy to form the film uniformly. Thus, before the application, half or more of the alcohol dispersion medium is preferably substituted with a higher alcohol such as propanol, butanol, and pentanol, which have a low vapor pressure. Then the sol solution is applied. The substitution with such alcohol in this manner can be performed by condensing the second sol solution using a rotary evaporator or the like, and then by diluting the second sol solution with an alcohol having a lower vapor pressure, for example. By performing the substitution in this manner, the evaporation speed is suppressed, and the application for the uniform thickness is made easy.

After the film formation, the unhardened certain refractive index layer 14 is not applied with a second sol solution for another certain refractive index layer 14 or with the first sol solution for the outermost layer 13 to be described below. Instead, the certain refractive index layer 14 is heated and hardened. This heating temperature is preferably from 50° C. to 200° C. when the optical substrate 10 is made of glass, and is preferably from 30° C. to 150° C. when the optical substrate is made of plastic.

When hardened in this manner, the certain refractive index layer 14 may be hardened completely. The certain refractive index layer 14 may be hardened to an extent that only the surface is hardened by being heated for a short period of time for time saving or the like.

Note that, when the multiple certain refractive index layers 14 are formed, the above-described operation should be repeated multiple times. In this case, it is necessary to use different second sol solutions for forming the respective certain refractive index layers 14 in a way that the solutions have different component ratios, concentrations, and the like.

Then, the first sol solution obtained as described above is applied on the surface of the certain refractive index layer 14 by the wet film-formation method for film formation, and hardened to form the outermost layer 13. Such a formation method for the outermost layer 13 can be performed in the same manner as the method for forming the certain refractive index layer 14.

Subsequently, such an outermost layer 13 is completely hardened. In a case where the certain refractive index layer 14 is not completely hardened, the certain refractive index layer 14 is hardened together with the outermost layer 13. In this manner, the production of an optical element is completed.

According to the forming method as described above, by adjusting the component ratio of the high-refractive-index fine particles 18 to the second binder component in the second sol solution for forming the certain refractive index layer 14, the refractive index of the certain refractive index layer 14 can be adjusted easily within a predetermined range. Moreover, by adjusting the concentrations of the high-refractive-index fine particles 18 and the second binder component in the second sol solution, the thickness of the certain refractive index layer 14 can be adjusted easily. Thus, the certain refractive index layer 14 can be easily formed to obtain a desired reflectance accurately.

Moreover, also in the outermost layer 13, by adjusting the component ratio and the concentrations of the low-refractive-index fine particles 15 and the first binder in the first sol solution, the refractive index and the film thickness of the outermost layer can be easily adjusted. Thus, the outermost layer 13 can be easily formed to obtain a desired reflectance accurately. As a result, it is possible to easily form an optical multi-layer thin film having a desired anti-reflection property.

EXAMPLES

Hereinafter, Examples will be described. However, the present invention is not limited to the following Examples.
(Preparation of $TiO_2$ Sol Solution)

Titanium isopropoxide is added with an equimolar amount of acetic acid, and thoroughly stirred. Heat is generated from the solution due to the reaction. The stirring was continued until the temperature became room temperature. The titanium isopropoxide was chelated. While thoroughly stirred, the chelated titanium isopropoxide was added dropwise slowly into a methanol solvent added with a small amount of nitric acid as the catalyst and a required amount of water for hydrolysis. The titanium isopropoxide was then hydrolyzed, and $TiO_2$ fine particles were prepared.

After the dropwise addition, the stirring was continued for 6 hours, and large aggregated particles were crushed. Thereby, a $TiO_2$ sol solution as a high-refractive-index fine particle sol solution was prepared.

Immediately after the preparation, a colorless transparent sol solution was obtained. After several days, the solution became slightly whitish and thereafter stabled. The $TiO_2$ concentration contained in the sol solution was set to 3 wt %.
(Preparation of $MgF_2$ Sol Solution)

A $MgF_2$ sol solution as a low-refractive-index fine particle sol solution was prepared using hydrogen fluoride aqueous solution (hydrofluoric acid) and magnesium acetate as the raw materials. 50% hydrofluoric acid and magnesium acetate tetrahydrate were respectively dissolved in methanol. While the magnesium acetate-methanol solution was being stirred, the hydrofluoric acid-methanol solution was added dropwise thereinto. The sol solution containing $MgF_2$ fine particles thus synthesized was placed into an autoclave made of Teflon (registered trademark), and hermetically sealed. The sol solution containing the $MgF_2$ fine particles was heated in the container at 140° C. to conduct high-temperature high-pressure treatment. The $MgF_2$ concentration was set to 2 wt %.
($SiO_2$ Binder Solution)

As solutions containing first and second binder components, used was a commercially available $SiO_2$ binder solution (made available from Sumitomo Osaka Cement Co., Ltd., SUMICEFINE G-200B ($SiO_2$-basis concentration: 1.63 wt %)).
(Preparation of Application Solution)

When the $TiO_2$ sol solution and $MgF_2$ sol solution were applied directly, it had been difficult to form a film uniformly. This is because almost all the dispersion media of the $TiO_2$ sol solution and $MgF_2$ sol solution thus obtained were methanol, and thus the evaporation speed of methanol is too fast. For this reason, the sol solution was condensed using a rotary evaporator, and then half or more of the methanol dispersion medium was substituted with an alcohol dispersion medium having a lower vapor pressure such as propanol and butanol. The $SiO_2$ binder solution had been added to each sol solution in advance, and the alcohol dispersion medium was substituted. Thereby, each application liquids were prepared.

In this manner, by diluting the sol solution with the organic medium having a low vapor pressure to substitute some of the methanol dispersion medium, the evaporation speed was suppressed, and the application for the uniform thickness without spots was made possible.

Example 1

Figure 2:
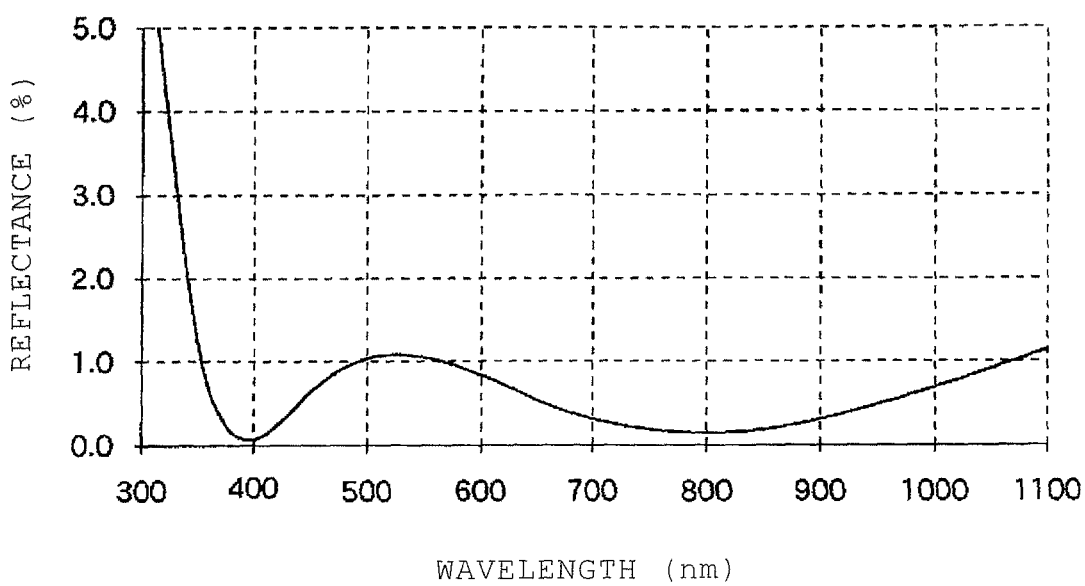
FIG. 2 is a drawing showing a spectral reflectance characteristic in accordance with design data on an anti-reflection film having a two-layered configuration in Example 1.

A wide-band anti-reflection film having a two-layered configuration was designed to be formed on a DF13 optical glass (nd=1.74). The design was made in a wavelength range of 300 to 1100 nm. As shown in FIG. 2, the reflectance at 350 to 1100 nm was approximately 1% or lower. The refractive index and thickness of each layer at 550 nm were as shown in Table 1 below.

TABLE 1

|  | Constituent substance | Refractive index | Film thickness (nm) |
|---|---|---|---|
| Second layer | $MgF_2$—$SiO_2$ | 1.26 | 89.05 |
| First layer | $TiO_2$—$SiO_2$ | 1.50 | 106.88 |
| Substrate | DF13 optical glass | | |

Firstly, a simulation was made on condition that each layer having a predetermined refractive index and film thickness was formed on a BSC7 optical glass, and the spectral reflectance characteristic was calculated. The result was as shown in Table 2 below. In the table, a first layer is a certain refractive index layer 14, and a second layer is an outermost layer 13.

TABLE 2

|  | Constituent substance | Lowest reflectance (%) | Center wavelength (nm) |
|---|---|---|---|
| Second layer | $MgF_2$—$SiO_2$ | 0.24 | 540 |
| First layer | $TiO_2$—$SiO_2$ | 6.23 | 568 |
| Substrate | BSC7 optical glass | | |

Then, the ratio of a $TiO_2$ sol solution to a $SiO_2$ binder solution and the ratio of a $MgF_2$ sol solution to a $SiO_2$ binder solution were actually changed to narrow down the refractive index, and the mixing ratio at which each composition ratio was achieved was determined.

Furthermore, the total film thickness was also narrowed down so as to match a set value, and a final film-formation condition was determined.

As for the first layer that is the certain refractive index layer 14, the $TiO_2$ sol solution was added to the $SiO_2$ binder solution in an amount of 4.54% relative to the $SiO_2$ binder solution. Using a rotary evaporator, the resulting solution was condensed until the weight became 1/2.34. Thereafter, propanol was added to dilute the solution until this solution had the original weight.

As for the second layer that is the outermost layer 13, the $SiO_2$ binder solution was added to the $MgF_2$ sol solution in an amount of 20% relative to the $SiO_2$ binder solution, and the $MgF_2$ concentration of the resultant application liquid was set to 3.0%. These are shown in Table 3.

TABLE 3

|  | Constituent substance | Added amount (%) |
|---|---|---|
| Second layer | $MgF_2$—$SiO_2$ | 20 ($SiO_2$) |
| First layer | $TiO_2$—$SiO_2$ | 4.54 ($TiO_2$) |

The $TiO_2$—$SiO_2$ application liquid was spin-coated on the DF13 optical glass substrate at a revolution of 2000 rpm. The substrate was baked at 160° C. for one hour, and then cooled to room temperature. Subsequently, the $MgF_2$—$SiO_2$ application liquid was spin-coated similarly, and a film was formed.

Figure 3:
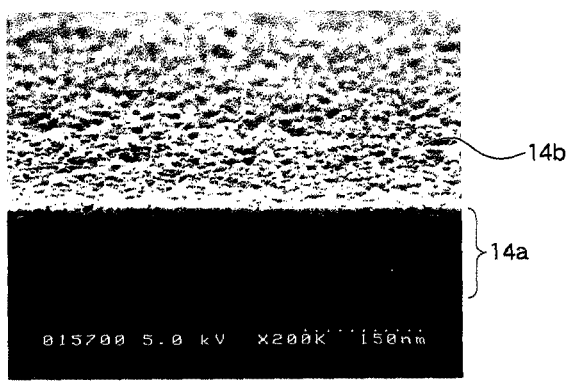
FIG. 3 is electron micrographs of a cross section and a surface of a $TiO_2$—$SiO_2$ optical thin film to serve as a certain refractive index layer in Example 1.

FIG. 3 shows scanning electron micrographs of a cross section 14a and a surface 14b of the $TiO_2$—$SiO_2$ film that constitutes the certain refractive index layer 14. The film was formed of $TiO_2$ fine particles, and had a relatively compacted structure. A pointed edge of the film on the cross section indicated that the film was compact and had a high refractive index.

Figure 4:
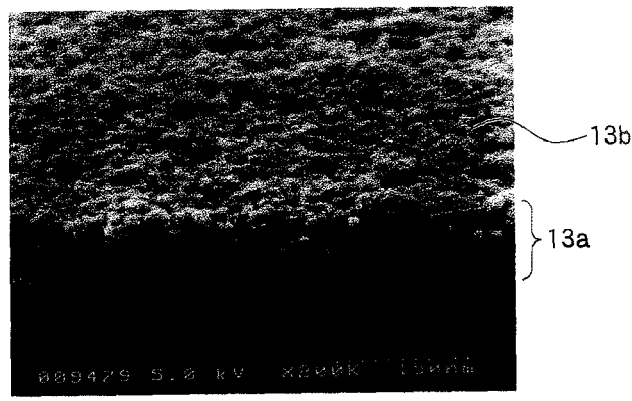
FIG. 4 is electron micrographs of a cross section and a surface of a $MgF_2$—$SiO_2$ optical thin film to serve as an outermost layer in Example 1.

FIG. 4 shows scanning electron micrographs of a cross section 13a and a surface 13b of the $MgF_2$—$SiO_2$ film that constitutes the outermost layer 13. The film had a porous structure formed of $MgF_2$ fine particles. It was indicated that the film had a low refractive index.

Figure 5:
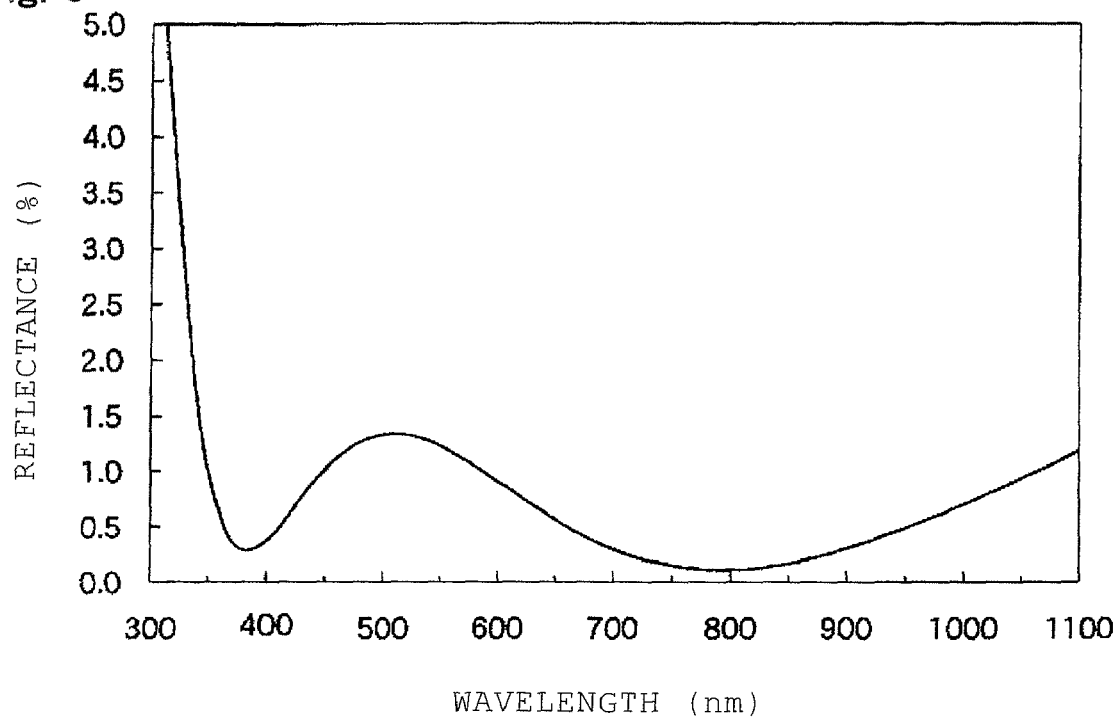
FIG. 5 is a drawing showing a spectral reflectance characteristic in accordance with measured data on the anti-reflection film as an optical multi-layer thin film having a two-layered configuration in Example 1.

FIG. 5 shows the measurement result of the spectral reflectance characteristic of a stacked film of these two layers having different refractive indexes from each other.

In comparison with FIG. 2, although the reflectance was slightly higher than designed one at a wavelength of around 500 nm, the overall characteristic was well matched with the design. From the visible range to the near-infrared range of 350 nm to 1100 nm, the reflectance was approximately 1% or lower. Even with an optical multi-layer thin film 12 formed of only two layers, it was possible to form a wide-band anti-reflection film with an excellent performance.

Figure 6:
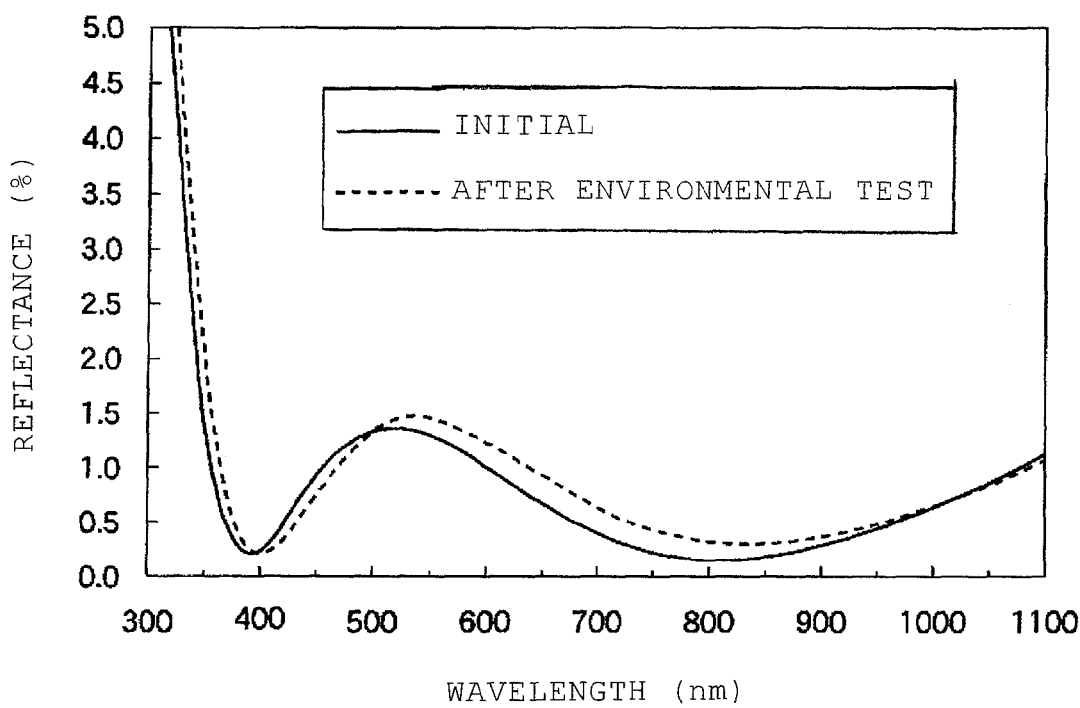
FIG. 6 is a drawing showing a spectral reflectance characteristic of the anti-reflection film as the optical multi-layer thin film having the two-layered configuration in Example 1 after an environmental test.

Using an optical element comprising the anti-reflection film, which is the optical multi-layer thin film 12, formed on an optical substrate 10, an environmental test (70° C., relative humidity: 80%, 40 hours) was conducted. FIG. 6 shows the measurement result of a spectral reflectance characteristic after the environmental test.

The spectral reflectance characteristic was not changed greatly even after the environmental test. This anti-reflection film had a sufficient environmental resistance.

This wide-band anti-reflection film that is the optical multi-layer thin film 12 formed of two layers was formed on a convex lens having D/R of 1.52. As a result, the spectral reflectance characteristic same as that in FIG. 3 was obtained at the vertex and peripheral portion of the lens. By the method according to the present invention, it was possible to form the above-described wide-band anti-reflection film uniformly also on the convex lens having a small curvature radius.

Example 2

Figure 7:
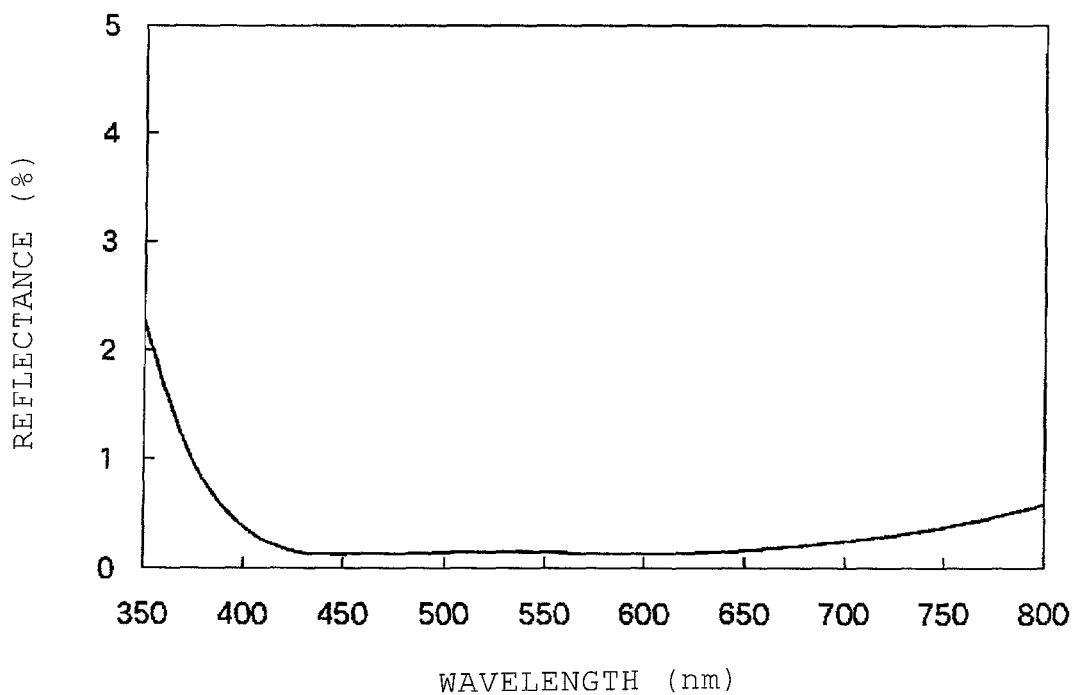
FIG. 7 is a drawing showing a spectral reflectance characteristic in accordance with design data on an anti-reflection film having a two-layered configuration in Example 2.

An anti-reflection film having a two-layered configuration was designed to be formed on a DF13 optical glass (nd=1.74). The design was made in a wavelength range of 350 to 800 nm. As shown in FIG. 7, the reflectance at 380 to 800 nm was approximately 1% or lower. The refractive index and the film thickness of each layer at 550 nm were as shown in Table 4 below. In the table, a first layer is a certain refractive index layer 14, and a second layer is an outermost layer 13.

TABLE 4

|  | Constituent substance | Refractive index | Film thickness (nm) |
|---|---|---|---|
| Second layer | $MgF_2$—$SiO_2$ | 1.26 | 103 |
| First layer | $TiO_2$—$SiO_2$ | 1.59 | 80.9 |
| Substrate | DF13 optical glass | | |

Firstly, a simulation was made on condition that each layer having a predetermined refractive index and film thickness was formed on a DF13 optical glass, and the spectral reflectance characteristic was calculated. The result was as shown in Table 5 below. In the table, a first layer is a certain refractive index layer 14, and a second layer is an outermost layer 13.

TABLE 5

|  | Constituent substance | Lowest reflectance (%) | Center wavelength (nm) |
|---|---|---|---|
| Second layer | $MgF_2$—$SiO_2$ | 0.26 | 520 |
| First layer | $TiO_2$—$SiO_2$ | 3.50 | 540 |
| Substrate | DF13 optical glass |  |  |

Then, the ratio of a $TiO_2$ sol solution to a $SiO_2$ binder solution and the ratio of a $MgF_2$ sol solution to a $SiO_2$ binder solution were actually changed to narrow down the refractive index, and the mixing ratio at which each component ratio was achieved was determined.

Furthermore, the total film thickness was also narrowed down so as to match a set value, and a final film-formation condition was determined.

As for the first layer that is the certain refractive index layer 14, the $TiO_2$ sol solution was added to the $SiO_2$ binder solution in an amount of 19.6% relative to the $SiO_2$ binder solution. Using a rotary evaporator, the resulting solution was condensed until the weight became 1/4.831. Thereafter, propanol was added to dilute the solution until this solution had the original weight.

As for the second layer that is the outermost layer 13, the $SiO_2$ binder solution was added to the $MgF_2$ sol solution in an amount of a 20% relative to the $MgF_2$ sol solution, and the $MgF_2$ concentration of the resultant application liquid was set to 2.87%. These are shown in Table 6.

TABLE 6

|  | Constituent substance | Added amount (%) |
|---|---|---|
| Second layer | $MgF_2$—$SiO_2$ | 20 ($SiO_2$) |
| First layer | $TiO_2$—$SiO_2$ | 19.6 ($TiO_2$) |

The $TiO_2$—$SiO_2$ application liquid was spin-coated on the DF13 optical glass substrate at a revolution of 2000 rpm. The substrate was baked at 160° C. for one hour, and then cooled to room temperature. Subsequently, the $MgF_2$—$SiO_2$ application liquid was spin-coated similarly, and a film was formed.

Figure 8:
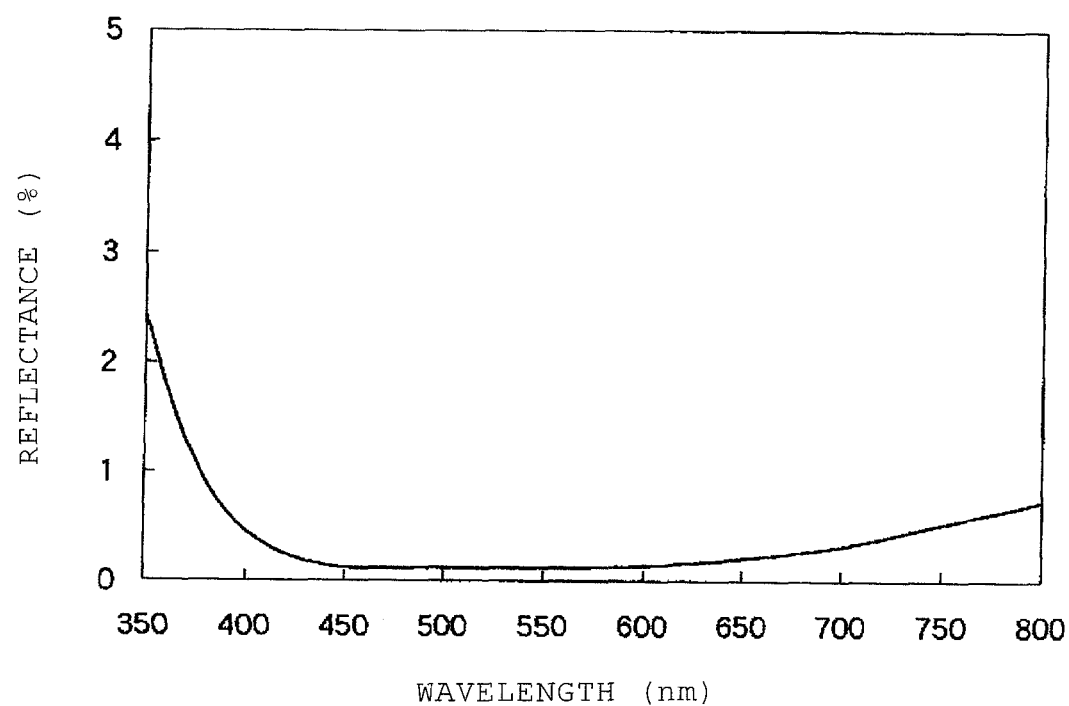
FIG. 8 is a drawing showing a spectral reflectance characteristic in accordance with measured data on the anti-reflection film as an optical multi-layer thin film having a two-layered configuration in Example 2.

FIG. 8 shows the measurement result of the spectral reflectance characteristic of a stacked film of these two layers of the certain refractive index layer 14 and the outermost layer 13 having different refractive indexes from each other.

In comparison with FIG. 7, the characteristic was considerably well matched with the design. From 400 nm to 750 nm, the reflectance was 0.5% or lower. Even with an optical multi-layer thin film 12 formed of only two layers, it was possible to form an anti-reflection film having a far low reflection.

This wide-band anti-reflection film that is the optical multi-layer thin film 12 formed of two layers was formed on a concave lens having D/R of 1.52. The spectral reflectance characteristic same as that in FIG. 8 was obtained at the vertex and peripheral portion of the lens. By the method according to the present invention, it was possible to form the multi-layer anti-reflection film uniformly also on the concave lens having a small curvature radius.

Example 3

An anti-reflection film having a two-layered configuration was designed to be formed on a DF13 optical glass (nd=1.74).

The design was made in a wavelength range of 350 to 800 nm. As shown in FIG. 7, the reflectance at 380 to 800 nm was approximately 1% or lower. The refractive index and the film thickness of each layer at 550 nm were as shown in Table 7 below. In the table, a first layer is a certain refractive index layer 14, and a second layer is an outermost layer 13.

TABLE 7

|  | Constituent substance | Refractive index | Film thickness (nm) |
|---|---|---|---|
| Second layer | $MgF_2$—$SiO_2$ | 1.26 | 103 |
| First layer | $ZrO_2$—$SiO_2$ | 1.59 | 80.9 |
| Substrate | DF13 optical glass |  |  |

Firstly, a simulation was made on condition that each layer having a predetermined refractive index and film thickness was formed on a DF13 optical glass, and the spectral reflectance characteristic was calculated. The result was as shown in Table 8 below. In the table, a first layer is a certain refractive index layer 14, and a second layer is an outermost layer 13.

TABLE 8

|  | Constituent substance | Lowest reflectance (%) | Center wavelength (nm) |
|---|---|---|---|
| Second layer | $MgF_2$—$SiO_2$ | 0.26 | 520 |
| First layer | $ZrO_2$—$SiO_2$ | 3.50 | 540 |
| Substrate | DF13 optical glass |  |  |

Then, the ratio of a $ZrO_2$ sol solution (made available from Sumitomo Osaka Cement Co., Ltd., a nano-zirconia dispersion liquid) to a $SiO_2$ binder solution and the ratio of a $MgF_2$ sol solution to a $SiO_2$ binder solution were actually changed to narrow down the refractive index, and the mixing ratio at which each component ratio was achieved was determined.

Furthermore, the total film thickness was also narrowed down so as to match a set value, and a final film-formation condition was determined.

As for the first layer that is the certain refractive index layer 14, the $ZrO_2$ sol solution was added to the $SiO_2$ binder solution in an amount of a 14.4% relative to the $SiO_2$ binder solution. Using a rotary evaporator, the resulting solution was condensed until the weight became 1/4.65. Thereafter, propanol was added to dilute the solution 3 times.

As for the second layer that is the outermost layer 13, the $SiO_2$ binder solution was added to the $MgF_2$ sol solution in an amount of 20% relative to the $MgF_2$ sol solution, and the $MgF_2$ concentration of the resultant application liquid was set 2.87%. These are shown in Table 9.

TABLE 9

|  | Constituent substance | Added amount (%) |
|---|---|---|
| Second layer | $MgF_2$—$SiO_2$ | 20 ($SiO_2$) |
| First layer | $ZrO_2$—$SiO_2$ | 14.4 ($ZrO_2$) |

The $ZrO_2$—$SiO_2$ application liquid was spin-coated on the DF13 optical glass substrate at a revolution of 2000 rpm. The substrate was baked at 160° C. for one hour, and then cooled to room temperature. Subsequently, the $MgF_2$—$SiO_2$ application liquid was spin-coated similarly, and a film was formed.

Figure 9:
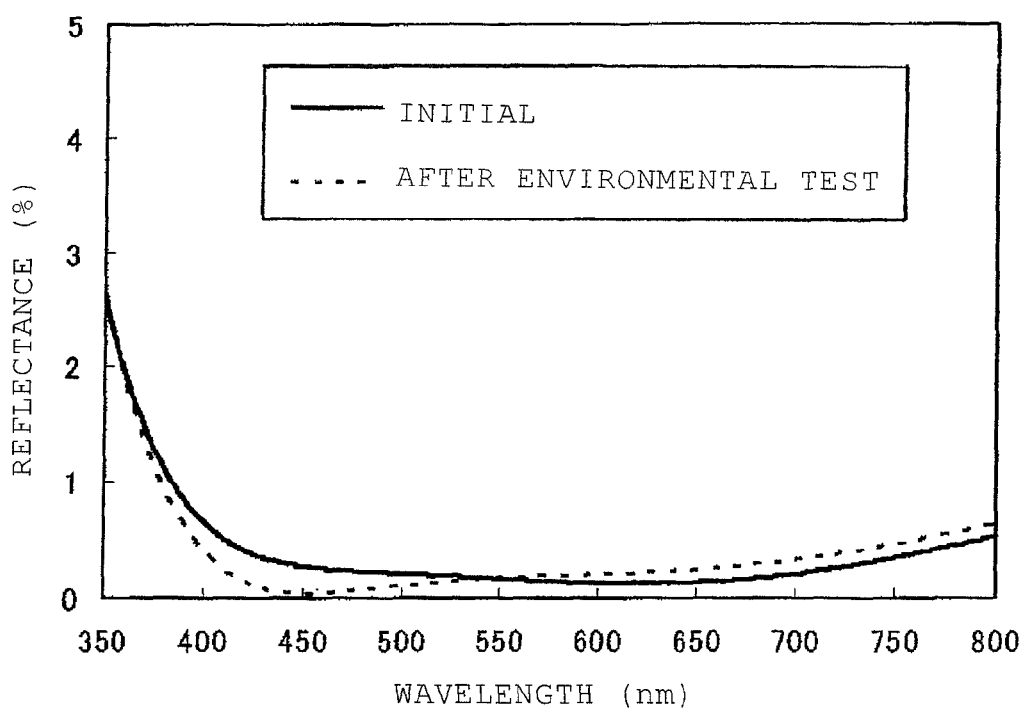
FIG. 9 is a drawing showing an initial spectral reflectance characteristic and a spectral reflectance characteristic after an environmental test in accordance with measured data on an anti-reflection film as an optical multi-layer thin film having a two-layered configuration in Example 3.

FIG. 9 shows the measurement result of the spectral reflectance characteristic of a stacked film of these two layers of the certain refractive index layer 14 and the outermost layer 13 having different refractive indexes from each other.

In comparison with FIG. 7, the characteristic was considerably well matched with the design. From 400 nm to 750 nm, the reflectance was 0.5% or lower. Even with an optical multi-layer thin film 12 formed of only two layers, it was possible to form an anti-reflection film having a far low reflection.

Moreover, using an optical element comprising the anti-reflection film, which is the optical multi-layer thin film 12, formed on an optical substrate 10, an environmental test (85° C., relative humidity: 85%, 24 hours) was conducted. FIG. 9 shows the measurement result of a spectral reflectance characteristic after the environmental test.

The spectral reflectance characteristic was not changed greatly even after the environmental test. This anti-reflection film had a sufficient environmental resistance.

This wide-band anti-reflection film that is the optical multi-layer thin film 12 formed of two layers was formed on a concave lens having D/R of 1.52. The spectral reflectance characteristic same as that in FIG. 9 was obtained at the vertex and peripheral portion of the lens. By the method according to the present invention, it was possible to form the multi-layer anti-reflection film uniformly also on the concave lens having a small curvature radius.

What is claimed is:

1. An optical thin film formed of only two layers, namely:
    an outermost layer which is stacked above an optical surface of an optical substrate, and which has a lower refractive index than that of the optical substrate; and
    a certain refractive index layer which is disposed between the optical surface of the optical substrate and the outermost layer, and which has a refractive index adjustable in a predetermined range higher than that of the outermost layer, wherein
    the refractive index of the certain refractive index layer at 550 nm is from 1.45 to 1.9,
    the refractive index of the outermost layer at 550 nm is from 1.20 to 1.30,
    the outermost layer is formed by a wet film-formation method using:
        low-refractive-index fine particles made of a low-refractive-index material having a lower refractive index than that of the optical substrate; and
        a first binder which binds the low-refractive-index fine particles together, and
    the certain refractive index layer is formed by a wet film-formation method using:
        high-refractive-index fine particles made of a high-refractive-index material having a higher refractive index than that of the low-refractive-index material; and
        a second binder which has a refractive index different from that of the high-refractive-index material, and which binds the high-refractive-index fine particles together, and
    wherein the reflectance of substantially an entire surface of the optical surface is 2% or lower over an entire wavelength range of 400 nm to 1100 nm.

2. The optical thin film according to claim 1, wherein the certain refractive index layer has a refractive index between those of the high-refractive-index material and the second binder.

3. The optical thin film according to claim 1, wherein the high-refractive-index material is any one of $TiO_2$ and $ZrO_2$.

4. The optical thin film according to claim 1, wherein the low-refractive-index material is $MgF_2$.

5. The optical thin film according to claim 1, wherein the first binder and the second binder are made of an identical intermediate-refractive-index material having a refractive index between those of the low-refractive-index material and the high-refractive-index material.

6. The optical thin film according to claim 5, wherein the intermediate-refractive-index material is $SiO_2$.

7. An optical element comprising:
    the optical substrate of claim 1, having a refractive index of from 1.5 to 2.1; and
    the optical thin film of claim 1.

8. The optical element according to claim 7, wherein the optical surface is any one of a convex surface and a concave surface having a value of (effective diameter D)/(radius R) being 1.2 or larger.

* * * * *